Oct. 6, 1953 — P. ORR ET AL — 2,654,441
LUBRICATION MEANS FOR TRANSMISSIONS
Filed Nov. 5, 1948 — 2 Sheets-Sheet 2
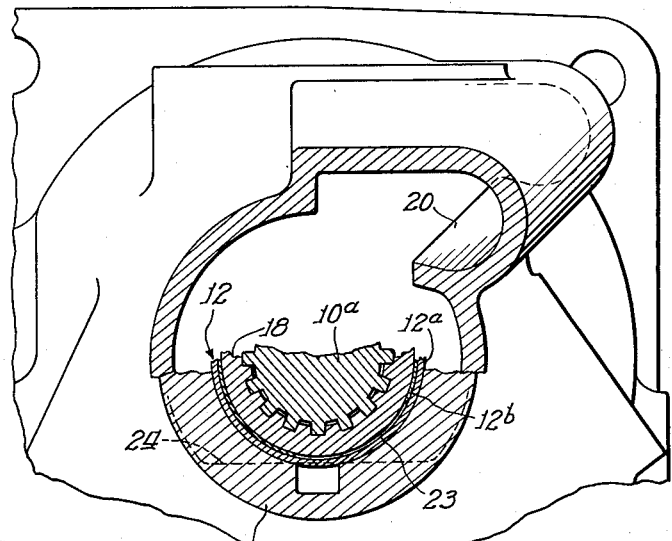
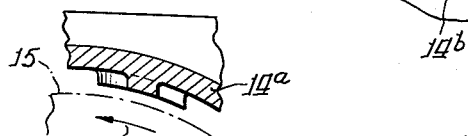
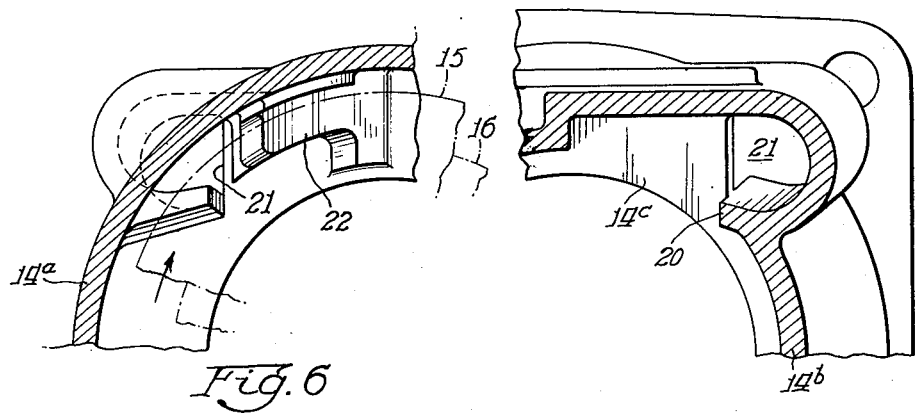
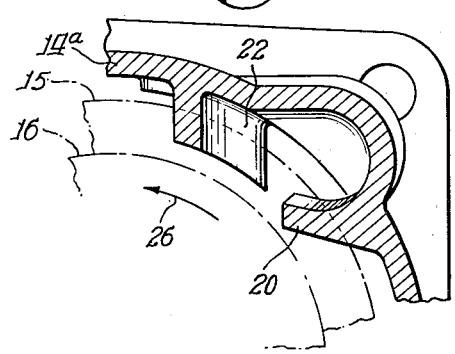
Inventors:
Palmer Orr and
Kenneth M. Armantrout
By: Edward C. Fritzlaugh
Atty.

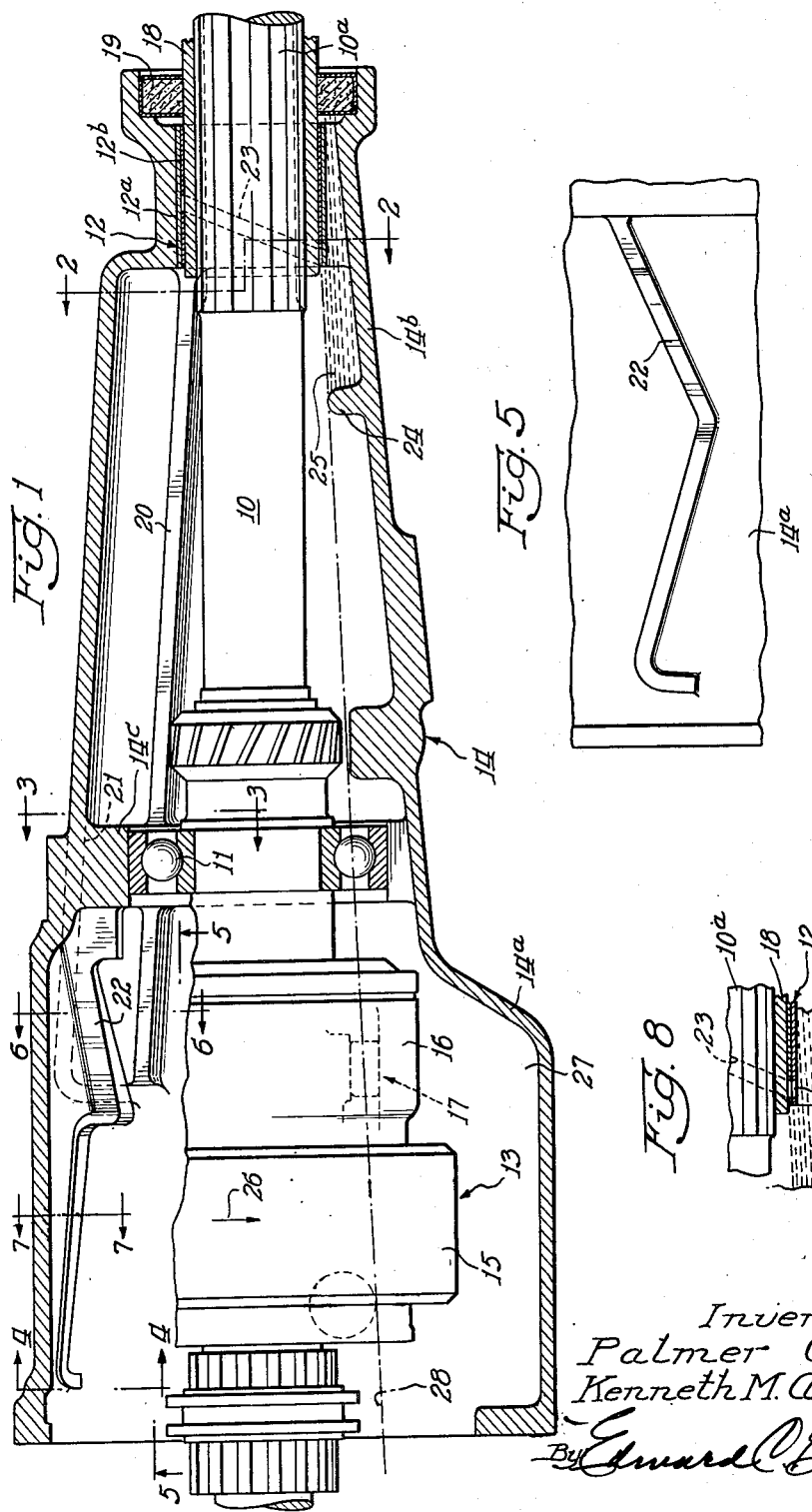

Patented Oct. 6, 1953

2,654,441

UNITED STATES PATENT OFFICE 2,654,441

LUBRICATION MEANS FOR TRANSMISSIONS

Palmer Orr and Kenneth M. Armantrout, Muncie, Ind., assignors to Borg-Warner Corporation, Chicago, Ill., a corporation of Illinois Application November 5, 1948, Serial No. 58,422
In Canada September 2, 1949

1 Claim. (Cl. 184—11)

Our invention relates to transmissions for automobiles and more particularly to lubricating arrangements for such transmissions.

Prior to our invention, lubricating trouble was had with transmissions having bearings quite substantially separated from the transmission gears. In particular, such trouble was had with the bearing for the tail shaft of an overdrive transmission which was held by an extension of the overdrive casing. There was insufficient oil for lubricating this bearing, and this effect was particularly pronounced after the transmission had been stored for a length of time and then installed in an automobile, at which time the bearing was substantially dry of lubricant and a binding action between the bearing and tail shaft existed.

It is an object of the present invention to provide an improved lubricant conducting arrangement for supplying lubricant to such a bearing, and it is a further object to provide means in the casing of the transmission for storing lubricant for use by such a bearing so that lubricant is available for the bearing after a prolonged period of storage of the transmission.

More specifically, it is an object to provide a channel-like shelf extending from adjacent the rotating gears of the transmission to the tail shaft bearing in the transmission casing extension, and it is also an object to provide a rib on the bottom of the transmission casing extension for forming with other portions of the extension a tank for a pool of lubricant adjacent the tail shaft bearing.

The invention consists of the novel constructions, arrangements and devices to be hereinafter described and claimed for carrying out the above-stated objects and such other objects as will appear from the following description of preferred embodiments of the invention illustrated with reference to the accompanying drawings, wherein:

Fig. 1 is a longitudinal sectional view of a transmission embodying the principles of our invention;

Figs. 2, 3 and 4 are sectional views taken on lines 2—2, 3—3 and 4—4 of Fig. 1;

Fig. 5 is a view of a certain flange within the transmission with the view being taken from line 5—5 of Fig. 1;

Figs. 6 and 7 are sectional views taken on lines 6—6 and 7—7 respectively of Fig. 1; and Fig. 8 is a fragmentary portion of a longitudinal sectional view similar to Fig. 1 of a modified form of the invention.

Like characters of reference designate like parts in the several views.

Referring now to the drawing, the illustrated transmission is one of the type commonly known as overdrives and comprises a driven or tail shaft 10 extending through bearings 11 and 12. The gearing 13 of the transmission is disposed in a casing portion 14a of a transmission casing 14 and is connected with the tail shaft 10 which extends through a casing extension 14b. As shown, the bearing 12 is disposed in one end of the casing extension 14b.

The gearing 13 is of a usual type and comprises a ring gear 15 connected with an enlarged portion 16 of the tail shaft 10. The enlarged portion 16 forms one member of a one-way roller clutch 17. The tail shaft 10 is adapted to be driven either through the ring gear 15 or through the one-way clutch, as is well-known. For further details of the transmission gearing contemplated, the application of Kenneth M. Armantrout, Serial No. 737,278, filed March 26, 1947, now Patent No. 2,548,761, issued April 10, 1951, may be referred to. The tail shaft 10 may be connected by any suitable means with the rear driving wheels of the vehicle in which the transmission is installed, and part of the connection may comprise a sleeve 18 extending over and in engagement with a splined end 10a of the shaft 10. The sleeve 18 is the part actually disposed in rotative relation with the bearing 12, as shown, and in order to retain lubricant within the transmission casing, a fluid seal 19 is provided in the end of the transmission and extending into contact with the sleeve 18.

The bearing 12, as has been explained, sometimes does not receive sufficient lubricant in order that the sleeve 18 may rotate therein without binding, and this is particularly true after the transmission has been allowed to set for sometime without usage. We have, therefore, provided means for conveying lubricant from the main transmission portion 14a to the bearing 12, and this comprises a rib 20 made into channel-like shape formed on the side of the main transmission portion 14a and extending downwardly into the transmission casing extension 14b. The portions of the rib 20 in the two parts of the transmission are connected by means of an opening 21 formed in the partition 14c of the transmission casing 14.

A scraper rib 22 is also formed in the transmission casing 14a and this extends in close proximity to the ring gear 15 and enlarged portion 16 of the driven shaft 10.

The bearing 12 comprises an outer steel sleeve 12a and an inner lining 12b affixed thereto and of a minimum friction bearing metal. A helical lubricant groove 23 is formed through liner portion 12b. The transmission casing extension 14b is provided with a laterally extending rib 24 adapted to form one side of a container for a pool 25 of lubricating fluid in the extension 14b.

In the operation of the transmission, the ring gear 13 and the driven shaft 16 normally rotate in the direction indicated by the arrows 26. A lubricating fluid, such as oil, is in the transmission sump 27 in the bottom of the casing 14, having a level as indicated by the line 28, and rotation of the ring gear and driven shaft in this direction causes oil to be brought up into the channel 20. The scraper rib 22 being in close proximity to the ring gear 15 and enlarged shaft portion 16 scrapes oil off these parts so that it flows into the channel 20 in the main transmission portion 14a, it being understood that the oil adheres to some extent to the parts 15 and 16 with rotation of these parts before being scraped off by the rib 22. The oil then flows down the channel 20 and into the pool 25 bounded on one end by the rib 24.

As is seen in Fig. 1, the pool 25 is in communication with the groove 23 in the bearing 12, and oil is drawn into this groove by rotation of the tail shaft 10 to thereby lubricate the bearing 12.

The rib 24 in the bottom of the transmission casing extension 14b maintains the pool 25 when the transmission is not operative, so that lubricant is immediately available for the bearing 12 upon resumed operation of the transmission. The presence of this pool is particularly important when the transmission is stored for prolonged periods of time, as for example between the time of its manufacture and the final installation of it in a vehicle.

The embodiment of the invention shown in Fig. 8 differs from that shown in Fig. 1 to 7 in that a hole 29 is provided in the bearing 12 which is in communication with the pool of lubricant 25. By means of this hole, a better communication is had between the pool of lubricant and the groove 23 in the bearing 12.

We wish it to be understood that our invention is not to be limited to the specific constructions and arrangements illustrated and described, except only insofar as the claim may be so limited, as it will be understood to those skilled in the art that changes may be made without departing from the principles of the invention.

We claim:

In a transmission assembly, the combination of a transmission housing comprising a main housing portion adapted to contain a liquid lubricant, a rearwardly extending elongated extension connected with the main housing portion, transmission gearing mounted for rotation in a certain direction within said main housing portion, a shaft driven by said transmission gearing and extending through said extension, a bearing in the rear end of said extension for rotatively supporting said shaft, the gearing extending below the surface of the lubricant in the main housing portion, an internal transverse rib for retaining a pool of lubricant in the rear end of said extension for lubricating said bearing, said bearing comprising a metal sleeve and having a helical groove therein for drawing lubricant from the pool in the rear end of said extension to lubricate said bearing during rotation of said shaft, a rib formed on the sides of said housing portion and said extension and forming a lubricant channel for conveying lubricant from the main housing portion through said extension and to said bearing and disposed so that lubricant is thrown against the underside of said channel and rib by said gearing as it rotates in said direction, and a lubricant scraper rib adjacent and spaced from said first named rib in said main housing portion in said direction of rotation from said first named rib for scraping lubricant from said gearing so that it falls into said channel to be conveyed thereby to said bearing.

PALMER ORR.
KENNETH M. ARMANTROUT.

References Cited in the file of this patent

UNITED STATES PATENTS

| Number | Name | Date |
|---|---|---|
| 1,512,676 | Cook | Oct. 21, 1924 |
| 1,961,029 | Benedek | May 29, 1934 |
| 2,032,318 | Herrington | Feb. 25, 1936 |
| 2,225,202 | Baker | Dec. 17, 1940 |
| 2,240,118 | Matthews | Apr. 29, 1941 |
| 2,430,752 | Yager | Nov. 11, 1947 |